(12) United States Patent
Deng et al.

(10) Patent No.: US 9,069,446 B2
(45) Date of Patent: Jun. 30, 2015

(54) MANAGEMENT OF INPUT METHODS

(71) Applicant: International Business Machines Corporation, Armonk, NY (US)

(72) Inventors: Yujie Deng, Austin, TX (US); Su Liu, Round Rock, TX (US); Steven R. Loomis, Saratoga, CA (US); Albert Zhongxing Yao, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/160,306

(22) Filed: Jan. 21, 2014

(65) Prior Publication Data

US 2014/0361975 A1 Dec. 11, 2014

Related U.S. Application Data

(63) Continuation of application No. 13/913,564, filed on Jun. 10, 2013.

(51) Int. Cl.
*G06F 17/20* (2006.01)
*G06F 3/0482* (2013.01)
*G06F 17/28* (2006.01)
(Continued)

(52) U.S. Cl.
CPC .......... *G06F 3/0482* (2013.01); *G06F 17/2863* (2013.01); *G06F 9/4443* (2013.01); *G06F 3/018* (2013.01)

(58) Field of Classification Search
CPC ..... G06F 17/276; G06F 3/0237; G06F 17/27; G06F 3/0233
USPC .................................................. 704/3, 7, 8
See application file for complete search history.

(56) References Cited

U.S. PATENT DOCUMENTS 6,301,626 B1 * 10/2001 Knox ............................... 710/10
6,356,866 B1    3/2002 Pratley et al.
7,412,374 B1 *  8/2008 Seiler et al. ...................... 704/8
(Continued)

FOREIGN PATENT DOCUMENTS

JP          2011118786 A       6/2011

OTHER PUBLICATIONS

Agichtein et al., "Learning User Interaction Models for Predicting Web Search Result Preferences", SIGIR '06: Proceedings of the 29th annual international ACM SIGIR conference on Research and Development in information retrieval, pp. 3-10, 2006, ACM, New York, NY, USA, © 2006.
(Continued)

*Primary Examiner* — Douglas Godbold
(74) *Attorney, Agent, or Firm* — Jonathan V. Sry; Thomas E. Tyson

(57) ABSTRACT

Embodiments of a system and method are disclosed concerning the management of a plurality input methods on a computer. The input method may define how input from a human interface device is interpreted by a receiving application. The method may include locating one or more input method factors. The method may also include determining a numerical score of the input method factor using a metric of the input method factor and a weight of the factor. The method may also include ranking an input method factor using the determined numerical score of the input method factor. The method may also include presenting a user selection interface that lists the plurality of input methods as a function of the ranking.

9 Claims, 9 Drawing Sheets

(51) Int. Cl.
*G06F 9/44* (2006.01)
*G06F 3/01* (2006.01)

(56) References Cited

U.S. PATENT DOCUMENTS

| | | | |
|---|---|---|---|
| 8,094,940 B2 | 1/2012 | Chen et al. | |
| 8,600,733 B1 * | 12/2013 | Buryak et al. | 704/8 |
| 8,738,356 B2 * | 5/2014 | Suzuki et al. | 704/2 |
| 2007/0173240 A1 | 7/2007 | Lim | |
| 2008/0046839 A1 * | 2/2008 | Mehra et al. | 715/810 |
| 2010/0217581 A1 * | 8/2010 | Hong | 704/3 |
| 2010/0245230 A1 | 9/2010 | Yaun | |
| 2011/0087962 A1 | 4/2011 | Paddon | 715/265 |
| 2011/0161081 A1 | 6/2011 | Ballinger et al. | |
| 2011/0209055 A1 * | 8/2011 | Plestid et al. | 715/265 |
| 2012/0019446 A1 | 1/2012 | Wu et al. | |
| 2012/0209591 A1 * | 8/2012 | Fux et al. | 704/8 |
| 2012/0226490 A1 * | 9/2012 | Mashiah | 704/8 |
| 2013/0144601 A1 * | 6/2013 | Scott et al. | 704/8 |

OTHER PUBLICATIONS

Anonymous, "A Method for Automatically Switch to the Right Input Method Editor (IME)", IP.com Prior Art Database, Oct. 19, 2012. IP.com No. IPCOM000222615D. http://priorartdatabase.com/IPCOM/000222615.

IBM, "Universal Web IME", IP.com Prior Art Database, Sep. 18, 2006. IP.com No. IPCOM000140670D. http://www.ip.com/pubview/IPCOM000140670D.

Microsoft, "Globalization Step-by-Step Input Language: Keyboards and IMEs" Go Global Development Center, http://msdn.microsoft.com/en-us/goglobal/bb688135.aspx. © 2013 Microsoft.

Unknown, "Chinese Input Methods for Computers", Wikipedia, last modified Apr. 26, 2013. http://en.wikipedia.org/wiki/Chinese_input_methods_for_computers.

Unknown, "Japanese Input Methods", Wikipedia, last modified Mar. 6, 2013. http://en.wikipedia.org/wiki/Japanese_input_methods.

Yu et al., "User Preference Learning for Multimedia Personalization in Pervasive Computing Environment", Knowledge-Based Intelligent Information and Engineering Systems: KES '05 Proceedings of the 9th International Conference—vol. Part II, LNAI 3682, pp. 236-242, © Springer-Verlag Berlin Heidelberg 2005.

Deng et al., "Management of Input Methods", U.S. Appl. No. 13/913,564, filed Jun. 10, 2013.

* cited by examiner

700

710

| LANGUAGE | TIMES ACCESSED | WEIGHT | SCORE |
|---|---|---|---|
| MANDARIN CHINESE | 17 | 40.00% | 6.8 |
| JAPANESE | 8 | 40.00% | 3.2 |

712

| LOCALE | TIMES ACCESSED | WEIGHT | SCORE |
|---|---|---|---|
| zh-Hant-CN | 11 | 20% | 2.2 |
| zh-Hant-SG | 4 | 20% | 0.8 |
| ja_JP | 8 | 20% | 1.6 |

714

| INPUT METHOD | TIMES ACCESSED | WEIGHT | SCORE |
|---|---|---|---|
| Pinyin | 5 | 40% | 2 |
| Wubi | 10 | 40% | 4 |
| Romanji | 6 | 40% | 2.4 |
| Kana | 2 | 40% | 0.8 |

716

| RANK | INPUT METHOD | SCORE |
|---|---|---|
| 1 | Wubi | 13 |
| 2 | Pinyin | 11 |
| 3 | Romanji | 7.2 |
| 4 | Kana | 5.6 |

FIG. 7

MANAGEMENT OF INPUT METHODS

CROSS-REFERENCE TO RELATED APPLICATIONS

This application is a continuation of co-pending U.S. patent application Ser. No. 13/913,564, filed Jun. 10, 2013. The aforementioned related patent application is herein incorporated by reference in its entirety.

FIELD

This disclosure generally relates to the management of input methods, specifically the ranking of input methods in a multiple language environment.

BACKGROUND

Input methods can be used to allow non-Roman characters to be input into a computing system. A user may have more than one input method on a multilingual enabled computing system with one or more locales so that the user has to select between two or more input methods rapidly. The locale can be a set of cultural and linguistic preferences for a computing system.

SUMMARY

A method and system of managing input methods is provided.

One embodiment may be directed towards a computer-implemented method of selecting a primary input method from a plurality of input methods. The input method may define how input from a human interface device is interpreted by a receiving application. The method may include locating one or more input method factors. The method may also include determining a numerical score of the input method factor using a metric of the input method factor and a weight of the factor. The method may also include ranking an input method factor using the determined numerical score of the input method factor. The rank of each input method may also be used to re-configure a new primary input method in real-time. The method may also include presenting a user selection interface that lists the plurality of input methods as a function of the ranking.

Another embodiment may be directed towards a system of selecting a primary input method from a plurality of input methods. Each input method may define how an input from a human interface device is interpreted by a receiving application on a computing processing system. The system may include an input method portfolio having the plurality of input methods. The input method may have one or more input method factors. The system may also include an input method daemon configured to score one or more input method factors, and rank the input methods as a function of the score of the input method factor. The input method may also include a user selection interface configured to visually convey the input methods as a function of the rank.

BRIEF DESCRIPTION OF THE DRAWINGS

FIG. 7 depicts a table that may result from the scoring of the input methods, consistent with various embodiments.

Unless otherwise specified, like reference numbers and designations in the various drawings indicate like elements.

DETAILED DESCRIPTION

Figure 1:
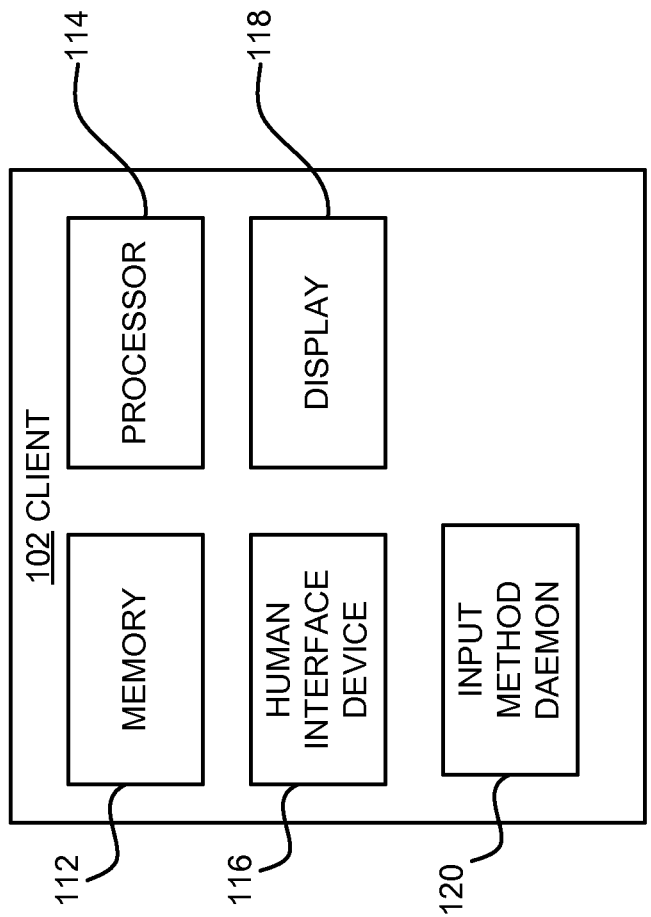
FIG. 1 depicts a block diagram of a client computer, according to various embodiments.

Aspects of the present disclosure are directed toward a method of ranking a plurality of input methods and selecting a primary input method from the ranked input methods on the fly. The present disclosure may concern locating one or more input method factors and determining a numerical score of the input method factor using a metric of the input method factor and a weight of the factor. The present disclosure may also concern using the numerical score of the factor to rank the input method and presenting the rank of a plurality of input methods for so that the user may select a primary input method. Although not necessarily limited thereto, embodiments of the present disclosure can be appreciated in the context of input methods and problems relating to selecting input methods.

In the descriptions provided herein, specific details of various embodiments are provided. However, various embodiments may be practiced with less than all of these specific details. In other instances, certain methods, procedures, components, structures, and/or functions are described in no more detail than to enable the various embodiments of the disclosure, for the sake of brevity and clarity.

Input methods can allow any data to be received as an input which can allow users to enter characters and symbols not found on their input devices. For example, input methods can allow the user of a Latin keyboard to input Chinese, Japanese, Korean, and Indic characters to a computing system. Examples of Indic characters include: Burmese, Nepalese, Thai, Bengali and Tamil. Input methods can also be used for Cyrillic, Greek, Latvian, Lithuanian, and Vietnamese scripts.

Input methods for the Chinese language can include shape-based input methods like WUBI, ZHENG CODE, and DAYI, and phonetic-based input methods like PINYIN, ZHUYIN. Input methods for the Japanese language can include ROMANJI, HIRAGANA, KATAKANA. Input methods for the Korean language can include HANGUL, and HANJA. Input methods for the Chinese, Japanese, and Korean language are used as examples throughout the disclosure for the purposes of illustrating languages that have multiple input methods.

Multiple input methods on a computing system exist for certain languages. In modern operating systems, multiple input methods may be configured/installed/selected, either manually or semi-manually, based on user preferences. The input method configuration may include, for instance, adding, deleting, re-ordering, deleting, re-ordering, invoking, and switching input methods in different levels of an operating system or application.

The order of input methods can be manually specified on some computer systems. Between manual interventions, the resulting order will remain fixed. Furthermore, in mobile devices, the storage space is limited for multiple input methods which may allow a mobile device to hold few input method file packages. Aspects of the present disclosure may concern a computer system designed to automatically generating a dynamic input method ranking from the analysis of the user's interaction with a plurality of input methods. The term input method may also refer to input method editors, or input method emulators interchangeably throughout this disclosure. Such aspects can be particularly useful for modifying how input methods are selected and/or displayed to users in the absence of (or in addition to) manual inputs.

FIG. 1 depicts a block diagram of a client computer 102, according to various embodiments. The client computer 102 may have a memory 112, a processor(s) 114, a human interface device 116, a display 118, and an input method daemon 120. As depicted, the client computer 102 may host a particular application that the user may access. In certain embodiments, the client computer 102 is a desktop, or laptop computer. The client computer 102 can also be a mobile computing device that allows a user to connect to and interact with the application running on the client computer 102.

Consistent with embodiments of the present disclosure, the client computer 102 can recommend or display a primary input method to a user. The primary input method can be a default input method in various embodiments. For instance, client computer can execute instructions stored in the memory 112 using the processor 114. In various embodiments, the memory 112 is a random access memory (RAM) or another type of dynamic storage device. In certain embodiments, the memory 112 is a read-only memory (ROM) or another type of static storage device. In certain embodiments, the illustrated memory 112 is representative of both RAM and static storage memory within the client computer 102. Hence, the memory 112 may store operations and functions associated with the generation of the file as well as a save operation to save the file to the memory 112 (as discussed in FIG. 2). In certain embodiments, the memory 112 is an electronically programmable read-only memory (EPROM) or another type of storage device. Additionally, various embodiments store the instructions as firmware such as embedded foundation code, basic input/output system (BIOS) code, or other similar code.

In certain embodiments, the processor 114 is a central processing unit (CPU) with one or more processing cores. In certain embodiments, the processor 114 is a graphical processing unit (GPU) or another type of processing device such as a general purpose processor, an application specific processor, a multi-core processor, or a microprocessor. Alternatively, a separate GPU may be coupled to the display device 118. In general, the processor 114 executes one or more instructions to provide operational functionality to the client computer 102. The instructions may be stored locally in the processor 114 and/or in the memory 112. Alternatively, the instructions may be distributed across one or more devices such as the processor 114, the memory 112, or another data storage device.

In various embodiments, the client computer 102 may include a human interface device 116. The human interface device 116 may receive an input from the user's key strokes, voice, or any input device, and may translate the input into computer-coded instructions for the client computer 102. For instance, the human interface device 116 may be a keyboard, mouse, touch screen, camera, microphone, or other device that uses any kind of tactile input. In certain embodiments, the human interface device 116 may be configured to receive an auditory input such as a voice commands. In certain embodiments, the human interface device 116 may use a visual input such as motions or gestures that give an instruction to the client computer 102.

In various embodiments, the display device 118 is a graphical display such as a cathode ray tube (CRT) monitor, a liquid crystal display (LCD) monitor, or another type of display device. In particular embodiments, the display device 118 is configured to visually display the primary input method. In various embodiments, the display device 118 may be an alternate method of communicating. For example, the display device 118 can be a spoken word audio interface for visually impaired users. The display device 118 can also be configured to display a user selection interface (discussed on FIG. 2) to allow the user to select an input method.

The client computer 102 may also include an input method daemon 120. The input method daemon 120 may be an application that the client computer 102 uses to perform the ranking, monitoring, and updating of the input method portfolio. Throughout the disclosure, the input method daemon 120 may be referred to periodically as the daemon 120. The operation and components of the input method daemon 120 may be further described on FIG. 2. In various embodiments, the daemon 120 resides in the memory 112 or at a location accessible via a network. The input method daemon 120 may be part of the operating system for the client computer 102.

Figure 2:
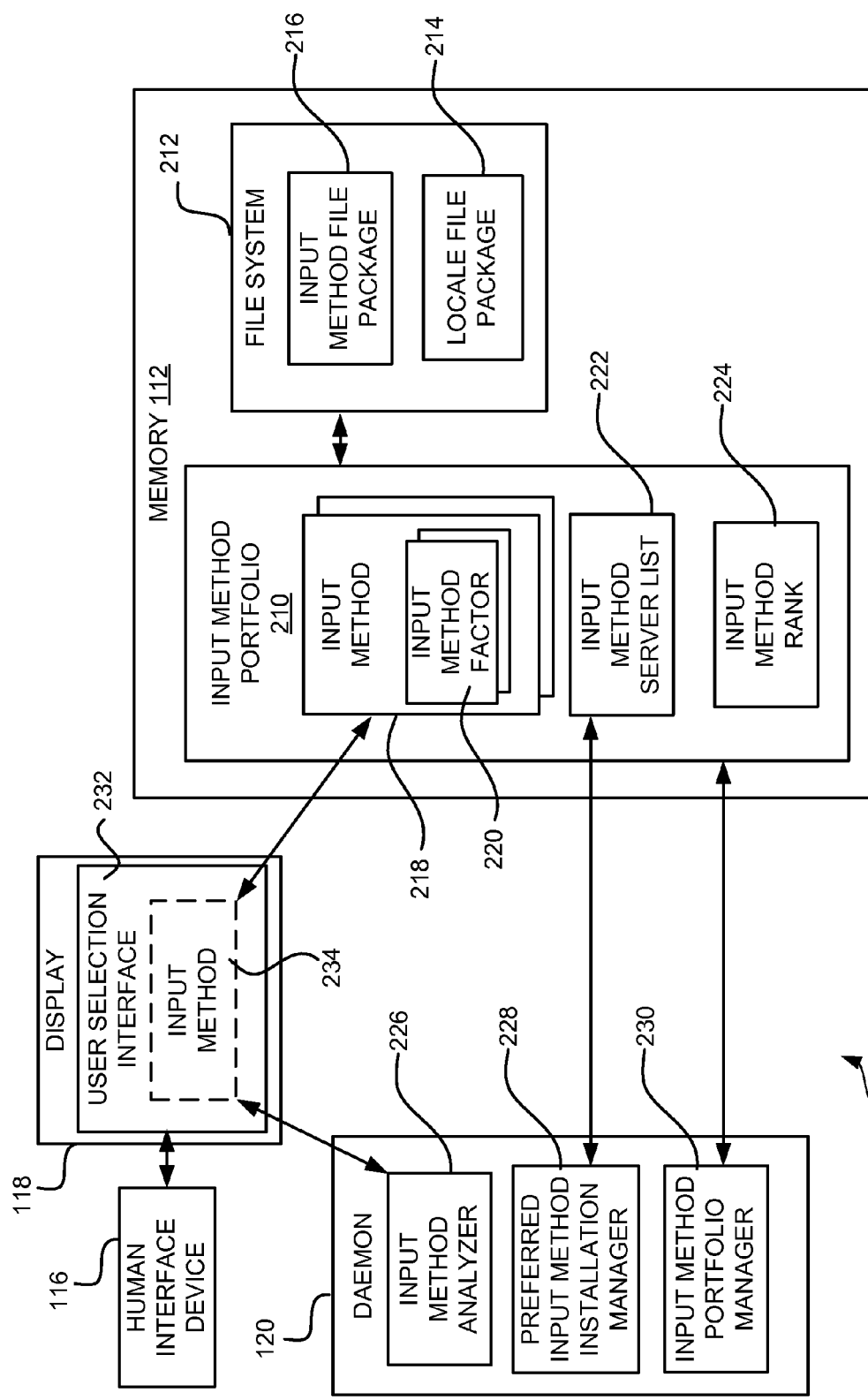
FIG. 2 depicts a block diagram of the interaction of the components of the client computer, consistent with various embodiments.

FIG. 2 depicts a block diagram of the interaction of the components of the client computer 102, consistent with various embodiments. As shown, the memory 112, the human interface device 116, the display 118, and the input method daemon 120 may interact in the client computer 102, according to various embodiments.

The memory 112 may correspond to the memory of the client computer 102 depicted on FIG. 1. As depicted, the memory 112 may have an input method portfolio 210, and a file system 212. The input method portfolio 210 may have a listing of the input methods available to the user and a history of the input methods selected by the user. The user on the client computer 102 may access the input method portfolio 210 and use the input method portfolio 210 to determine the primary input method or determine a rank of input methods relative to each other. The input method portfolio 210 may access the file system 212 to gain access to the file packages associated with the input methods. In certain configurations of the embodiment, the input method portfolio 210 may contain the file packages associated with the input methods without the need for a file system.

In certain embodiments, the file system 212 is a software and/or hardware mechanism to store and organize electronic content, such as files and data stored in the files on the memory 112. The file system 212 generally allows a user to find, search for, and access the files stored on a storage device. Hence, in general, the file system 212 includes a database for the storage, hierarchical organization, manipulation, navigation, access, and retrieval of files and data associated with the files. For instance, the file system 212 may include a disk file system, a flash file system, a database file system, a transactional file system, a network file system, and/or other similar file systems. The file system 212 may access data from a data storage device such as a hard disk or compact disc read only memory (CD-ROM) and require the maintenance of the physical locations of the files. Additionally, the file system 212 may access data on a file server by acting as a client for a network protocol. The file system 212 may also include a virtual filing system such as a process file system (procfs).

In the shown configuration, the file system 212 may have the input method file packages 216 and related locale file packages 214, but more file packages are possible. The input method file package 216 may be a file or group of files that contains the instructions for the client computer 102 to recognize a particular input. For example, the input method file package 216 for a WUBI input method, which is a type of Chinese language input method, may contain the different strokes available for the user and the corresponding Chinese Character values (such as Unicode Code Point). The locale file package 214 may be a file of different locales. The locale file package 214 may include, but not necessarily include, one or more input method file packages 216. For example, the locale file package 216 may include Simplified Chinese with the WUBI and PINYIN input method.

As mentioned above, the input method portfolio 210 may have a listing of all the input methods available to the client computer 102 and a history of all of the user interactions with a particular input method. In the shown configuration, the input method portfolio 210 may have one or more input methods 218 and each input method 218 may have one or more input method factors 220. The input method factor 220 may include a history of input method usage, or a history of the locale usage. The input method factor 220 can include associations with locales and languages. For example, if the input method 218 is PINYIN, then the input method factor 220 can be the locale used with the PINYIN input method. The input method factors 220 are described further below. In certain embodiments, the input method portfolio 210 may have a table of input methods 218, followed by input method factors 220 that correspond to each input method 218. The input method portfolio 210 may also have an input method server list 222.

The input method file packages 216 and the locale file packages 214 contained in the file system 212 may not contain every file package available to the client computer 102. Consistent with embodiments, one or more remote servers (discussed further in FIG. 3) may have the file packages associated with a particular input method. The input method portfolio 210 may have an input method server list 222 to identify the location of the input method on a remote server. The input method server list 222 may point to local copies of the input method. For example, if the input method is located on a partition of the memory 112, then the input method server list 222 may point to a different user on the same client computer 102. In various embodiments, the input method server list 222 may contain servers for particular languages. For example, a server containing input methods for the Japanese language may be a different server than the server containing input methods for the Korean language.

In an embodiment, the input method portfolio 210 may form an ordered rank of input methods based on the input method factors 220. For example, if the input method portfolio 210 is a table of the input methods 218 along with the input method factors 220, then the rank 224 may be another factor associated with the input method 218. In certain embodiments, the rank of the input methods 218 may be stored in a separate file referred to as an input method rank 224. In certain embodiments, the input method rank 224 may be a file that lists the input method 218 along with a number value that corresponds with a rank. The input method rank 224 may also be a list of input methods 218 with a particular order.

The client computer 102 may also have a daemon 120. As described above, the daemon 120 may be used to rank input methods 218 in the input method portfolio 210 and select a primary input method based on the input method rank 224. The daemon 120 may also be used to run applications outside of the scope of selecting a primary input method. For example, the input method daemon 120 may manage user selections or install a required language support file packages.

In the shown configuration, the daemon 120 may have an input method analyzer 226, an input method installation manager 228, and an input method portfolio manager 230. The daemon 120 may use the input method analyzer 226 to examine the input method factors 220 that occur as events in the client computer 102. For example, the analyzer 226 may analyze the web pages visited to determine the locale, which can be a set of cultural and linguistic preferences, and use the locale to narrow down a predicted input method. In another example, the analyzer 226 may monitor the input method used when drafting a document as well as the time spent using the input method.

The analyzer 226 may also look at which location they are from, as well as linguistic analysis of the content. For example, the analyzer 226 may also examine other operating system settings such as the time zone, as well as network connectivity for location approximation. The analyzer 226 may use any device on the client computer 102. For example, the analyzer 226 may use a GPS, geo-location data, domain name, IP address, language metadata, processed scripts, or accessed languages in order to determine the language and the common input method preferred by other users in the same geographic area.

If the input method portfolio 210 does not have an input method file package 216 in the file system 212, then the daemon 120 may download the input method file package corresponding to the input method 218 using the input method server list 222. Specifically, the daemon 120 may have an input method installation manager 228 to track and install or uninstall an input method not in the file system 212. In various embodiments, the user may select an input referred to as a preferred input method when the primary input method is not adequate to the user. If the preferred input method is not installed onto the client computer 102, then the client computer 102, through the installation manager 228, may use the input method server list 222 to connect to a server containing input method file packages. The relationship between the server and the client computer 102 may be further described in FIG. 3.

The daemon 120 may also have an input method portfolio manager 230. The input method portfolio manager 230 may monitor the input method portfolio 210. The input method portfolio manager 230 may manage the input method rank 224. In certain embodiments, the input method portfolio manager 230 may ensure that all references within the input method portfolio 210 are functioning. For example, the input method portfolio manager 230 may ensure that the input method server list 222 has links to active servers and may monitor the status of the various servers. As shown, the input method portfolio manager 230 may communicate with the input method portfolio 210.

The client computer 102 may select a primary input method to present an input method 218 to the user through the display 118. In certain embodiments, the daemon 120 may present more than one input methods to the user in a ranked form. For example, the user may be presented with a list of more than one input methods 218 in a ranked form but the primary input method may appear first.

The display 118 may use a user selection interface 232. In various embodiments, the user selection interface 232 may be a graphical user interface or auditory user interface and may be part of the operating system for the client computer 102.

The user selection interface 232 may allow the user to select a selected input method 234 in real-time. Real-time can be defined by microseconds with the user selection influencing the rank. The selected input method 234 may be a primary input method that the client computer 102 recommends or may be an input method 218 that is selected by the user, e.g., the preferred input method.

As mentioned above, the user may interact with the user selection interface 232 of the client computer 102 through a human interface device 116 to select the selected input method 234. In an embodiment, the user selection interface 234 may display the selected input method 234 obtained from the input method portfolio 210, particularly the input methods 218 obtained from the input method rank 224. The input method rank 224 may be formed using the interactions with the daemon 120. The user may accept the input method presented or may select another input method 218. If the user selects another input method 218 other than one presented, then the input method analyzer 226 may receive the selection of the user. The daemon 120 may use the selection of the user to influence the input method rank 224.

Figure 3:
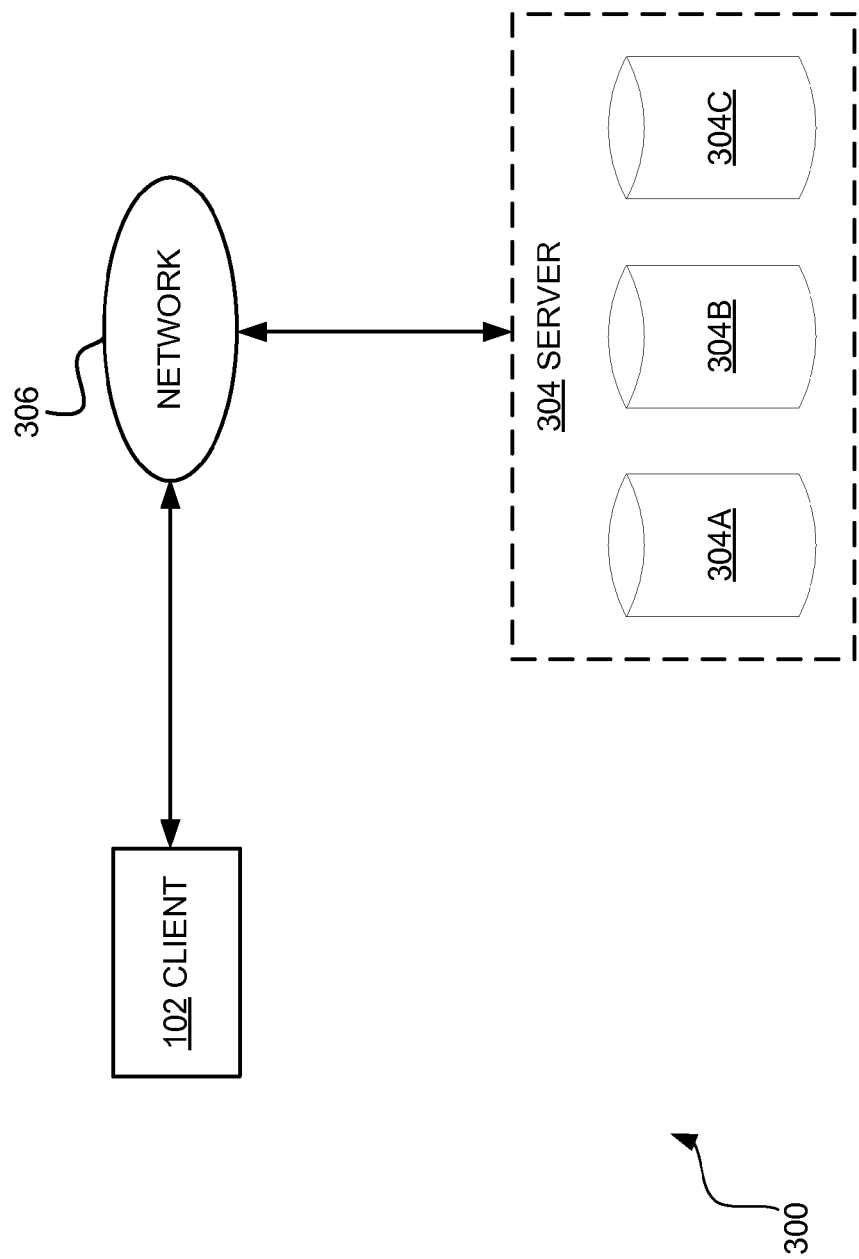
FIG. 3 depicts a high-level diagram of a system that includes client computer and server interactions, consistent with various embodiments.

FIG. 3 depicts a high-level diagram of a system 300 that includes client computer 102 and server interactions, consistent with various embodiments. As depicted, the system 300 may include a client computer 102, a server 304, and a network 306. The server 304 may be optional and the client computer 102 may be the primary computer, in various embodiments. For example, the client computer 102 may stand alone without a connection to a server 304. In certain embodiments, more than one server 304 may exist in the system 300. In the shown embodiment, the server 304 may have one or more server locations; 304A, 304B, and 304C. Each server location, e.g., 304A, may have one or more input method file packages 216 or locale file packages 214.

The system 300 may allow a user to interface with the client computer 102. In one configuration, the client computer 102 may be a partition and the server 304 may be on another partition. Although the depicted system 300 is shown and described herein with certain components and functionality, certain embodiments of the system 300 may be implemented with fewer or more components or with less or more functionality. For example, various embodiments of the system 300 may not include a network 306 and a server 304. Hence, various embodiments of the system 300 include only the client computer 102. Additionally, various embodiments of the system 300 may include a plurality of client computers 102 and a plurality of networks 306. Additionally, various embodiments of the system 300 may include similar components arranged in another manner to provide similar functionality, in one or more aspects. In certain embodiments, the server 304 is an array of servers. Additionally, multiple server instances may be run on a single server 304.

The server 304 may connect to the client computer 102 via a local area network (LAN) or other similar network 306. The network 306 may communicate traditional block input/output (I/O), such as over a storage area network (SAN). The network 306 may also communicate file I/O, such as over a transmission control protocol/internet protocol (TCP/IP) network or similar communication protocol. In various embodiments, the system 300 comprises two or more networks 306. Alternatively, the server 304 may be connected directly to the client computer 102 via a backplane or system bus. In certain embodiments, the network 306 may include a cellular network, other similar type of network, or combination thereof.

Figure 4:
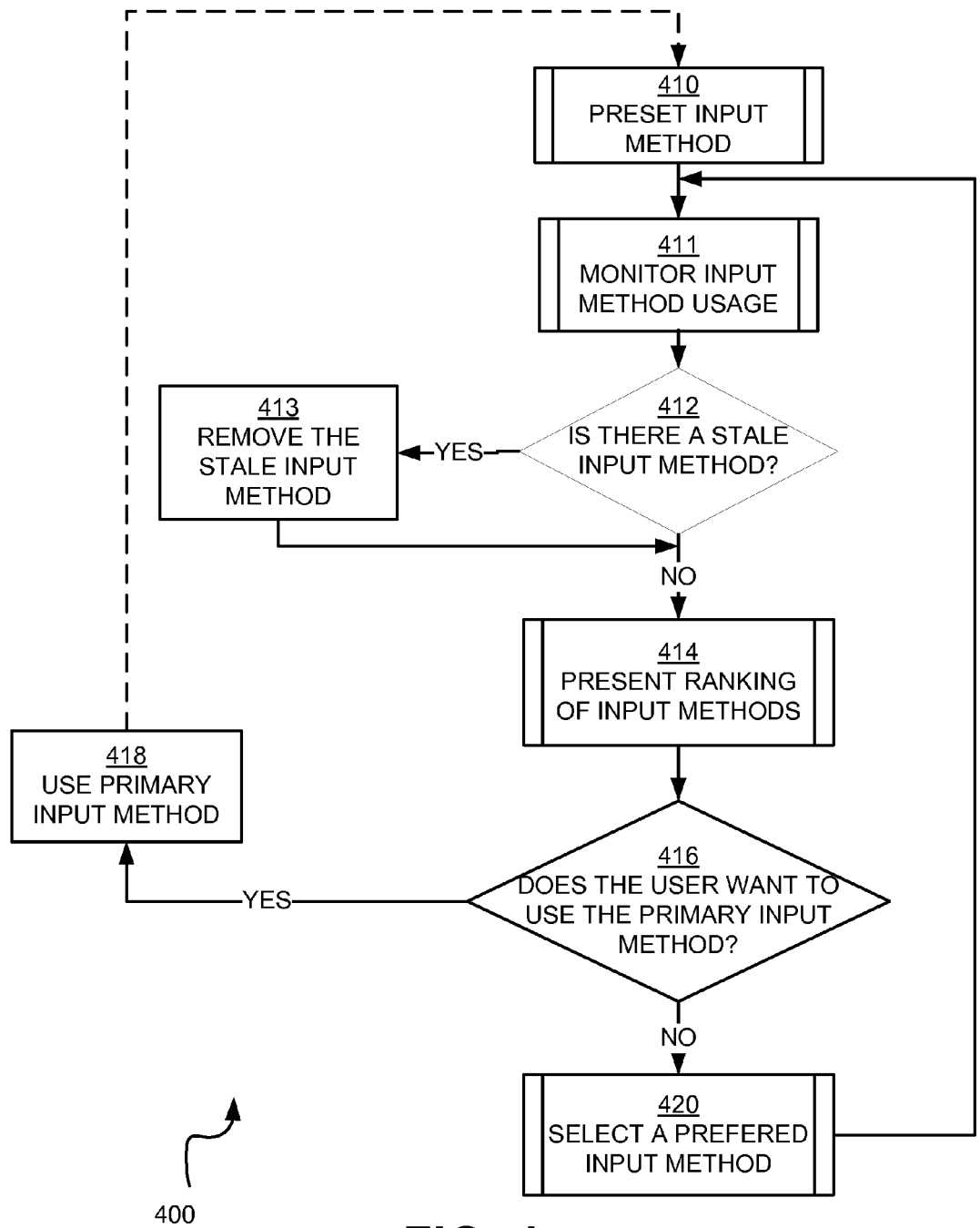
FIG. 4 depicts a high-level flowchart of a method to select a primary input method or a preferred input method, consistent with various embodiments.

FIG. 4 depicts a high-level flowchart of a method 400 to select a primary input method or a preferred input method, consistent with various embodiments. Overall, the method 400 may select a primary input method or allow the user to select the preferred input method which may improve selection of the primary input method. The method 400 may begin at operation 410 where the input method is preset. In the preset operation, the daemon 120 may take an 'inventory' of all the input methods present on the client computer 102 and load a default list. This process is described in more detail on FIG. 5.

After the input method is preset, the method 400 may continue to operation 411. In operation 411, the daemon 120 may assign metrics to various factors in order to determine a ranking of input methods for different languages. Operation 411 may be further described in FIG. 6.

After the input methods are ranked in the input method rank 224, the method 400 may proceed to operation 412. In operation 412, the daemon 120 or a component of the daemon 120, e.g., the input method portfolio manager 230, may determine whether there are any stale input methods in the input method portfolio 210. Stale input methods may be input methods that are unlikely to be selected as a primary input method or selected by the user. In certain embodiments, the stale input method may be an unused input method in the input method portfolio 210. For example, if an input method 218 is not used within two months, then it may be considered stale. An input method that is unlikely to be selected by the user may be triggered by a geographic location or a browsing history in a web browser. In certain embodiments, the geographic location or browsing history may be compared to other users to determine popular input methods. For example, an input method 218 may be considered stale if the user has a geographic location of a particular region of a country, e.g., determined by IP address or GPS, where a majority of users use a particular input method.

There may be instances where the user can select stale input methods to remove. In various embodiments, the display device 118 or user selection interface 232 can highlight particular input methods that are close to becoming stale. For example, the input method that is close to becoming stale can be an input method that has not been used in 5 weeks when the threshold is 6 weeks. The close to becoming stale input method can be highlighted, for example, by dimming the input method on the user selection interface 232. The user can also choose to explicitly keep the close to becoming stale input method or the stale input method around, in various embodiments.

The method 400 may proceed to operation 413 in response to a determination of a stale input method. In operation 413, one or more input methods may be removed. For example, if the input method HANGUL is not used within a time period, e.g., 4 weeks, then the input method file package 216 may be removed from the memory 112. In certain embodiments, the input method may be removed if it falls below a certain rank, e.g., in operation 620 described in FIG. 6. For example, the daemon 120 may remove all but the five top ranked input methods. If the input method HANGUL is ranked sixth and the input method file package 216 is present on the client computer 102, then the input method file package 216 for HANGUL may be removed.

In operation 414, the daemon 120 may present a primary input method to the user based off of the input method rank 224. In various embodiments, the input method rank 224 may exist for each application on the client computer 102. The input method daemon 120 may select a primary input method depending on the application used. For example, a user may use a primary input method of PINYIN for a web browser but use a primary KANA input method for a text-based chat program. In various embodiments, operation 414 may reorder the input method rank 224 using updated input method factors 220. For example, if the user selected the WUBI input method instead of the primary input method PINYIN in a particular application, then the input method daemon 120 may use the user input of the WUBI input method as a input method factor when reordering the input method rank 224. The presentation of the primary input method can occur in real-time where the input methods are continuously ranked and presented to the user as the input methods are ranked. Operation 414 may be further described in FIG. 8.

After a primary input method is selected by the input method daemon 120, then the method 400 may proceed to operation 416. In operation 416, the client computer 102 may prompt the user to determine if the user wants to use the primary input method. In various embodiments, the user may be prompted by the client computer 102 via a user selection interface 232 to make a selection other than the primary input method. For example, if the primary input method is WUBI, the client computer may use the WUBI input method unless the user selects another input method.

In various embodiments, the primary input method can be selected automatically, i.e., without taking into account user input. The primary input method may be automatically selected with or without notifying the user when the input method is automatically changing. In various embodiments, the user may be presented with an option to revert to the prior input method which can be reflected in the input method rank 224. Notifying the user when the input method is automatically changing may have advantages when, for example, a software application may be in Japanese, but the user has occasional or frequent use of Chinese.

In certain embodiments, the client computer 102 may adjust the input methods based on the language displayed. For example, if the input method is PINYIN but the text on the application is in Japanese, then the computer 102 may offer KANA or other input methods for the Japanese language. If the user selects the primary input method, then the method 400 may proceed to operation 418.

Alternatively, the user may select a different input method referred to as the preferred input method. If the user selects the preferred input method, the method 400 may proceed to operation 420 (further described in FIG. 9). The user may prompted if the user is performing a triggering event, e.g., if the user is typing as opposed to reading (discussed further below). The selection of a preferred input method in operation 420 can further influence the measurement of input method factors in operation 411.

Figure 5:
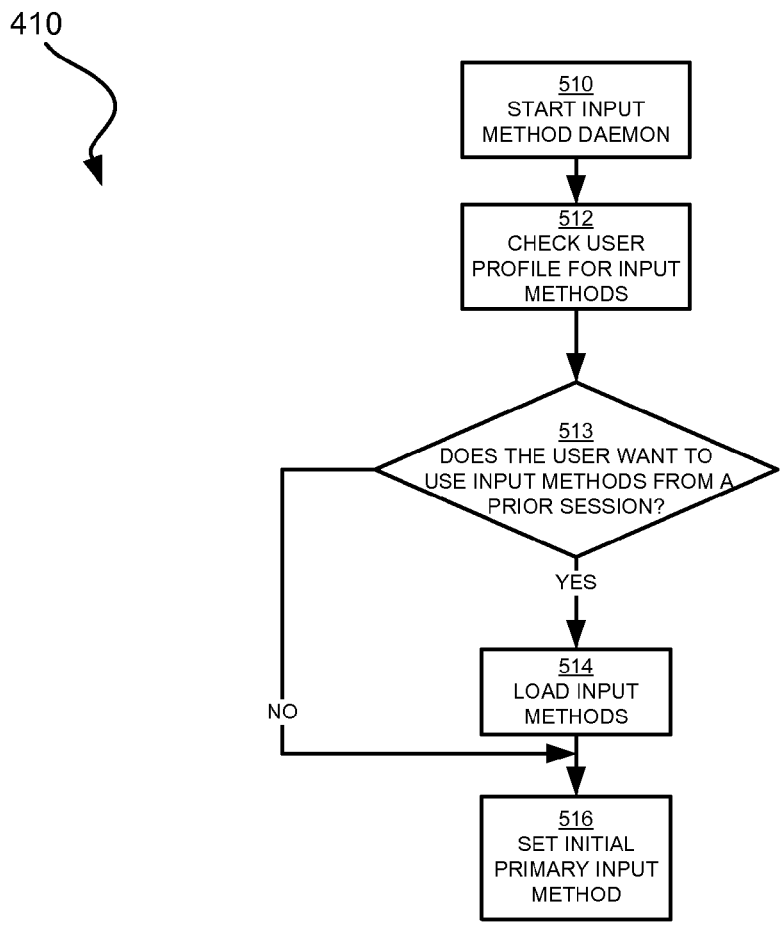
FIG. 5 depicts a flowchart of the method to preset an input method, consistent with various embodiments.

FIG. 5 depicts a flowchart of the method 410 to preset an input method, consistent with various embodiments. The method 410 may correspond to operation 410 in FIG. 4. The method 410 may preset an input method when the client computer 102 initializes. In certain embodiments, the client computer 102 initializes during a startup or when a new user is activated, but other configurations are contemplated. In the preset operation, the input method is loaded onto a client computer along with an initial primary input method order (discussed further below).

The method 410 may begin at operation 510. In operation 510, the input method daemon 120 may start. The input method daemon 120 may be loaded at an operating system level or whenever the client computer 102 starts up in a boot mode. In various embodiments, the input method daemon 120 may be loaded onto the file system 212 and started from the memory 112.

After the input method daemon 120 starts, then the user profile is checked in operation 512. The user profile may uniquely identify a particular user and may contain user preferences, e.g., an affinity of a user to user certain input method. The user profile may be loaded along with the operating system on the client computer 102 in various embodiments. The user profile may be checked by a simple authentication process to verify the user identity. The user profile may also be checked for user's preferred input method that may be obtained in operation 420. This may also include past instances of input method usage obtained in operation 418. For example, the user profile may show that the user used the WUBI input method four times but used the PINYIN input method only once which indicates that the WUBI input method is preferred by the user. In another example, the user profile may rank the WUBI input method over the PINYIN input method for Chinese in a structured list. The language used in the client computer 102 may be used to determine the influence method. For example, the language Han Chinese may be associated with the WUBI, or PINYIN input method but not the KANA input method. The current language being used by the user may be detected using the following pseudo code:

```
get current locale:
   cur_locale = setlocale(LANG,0);
Parse the cur_locale string: zh_Hans_CN.UTF-8 to zh, Hans,
CN, UTF-8
   LANGUAGE TAG:   zh: Chinese
   Script TAG:     Hans: Simplified Chinese
   Region TAG:     CN: China (mainland)
   Codset TAG:     UTF-8: Unicode encoded in UTF-8 scheme
```

After the user profile is checked, then the method 410 may proceed to operation 513. In operation 513, the daemon 120 may determine whether the user wants to use input methods from a prior session. In various embodiments, the user may receive a prompt on a user selection interface 232. In certain embodiments, the daemon 120 may assume that the user wants to use input methods from a prior session. The user may indicate to the client computer 102 to use the input methods from a prior session and the method 410 may proceed to operation 514. The user may also not elect to user input methods from a prior session and the method 410 may proceed to operation 516.

In operation 514, one or more input methods are loaded onto the operating system. The input methods that are loaded may depend on the input methods projected to be used from the user profile. For example, if the user profile indicates that WUBI (Chinese), and KANA (Japanese) are the most frequently used input methods, then the input method file package 216 for both WUBI and KANA may be loaded so that is may be accessed by the operating system.

After the input method is loaded, then the method 410 may proceed to operation 516. In operation 516, an initial primary input method order or rank is set and an initial primary input method may be selected from the initial primary input method rank 224. In various embodiments, the initial input method rank 224 may be set by the daemon 120 and loaded into the input method portfolio 210.

The initial input method rank 224 may be modified in subsequent operations, e.g., operation 411 or operation 418 in FIG. 4. The initial input method rank 224 may incorporate the input method preferences on the user profile. For example, if the user profile indicates that WUBI was used the most, followed by KANA, followed by PINYIN, then the initial input method rank 224 may resemble WUBI, KANA, and PINYIN. The client computer 102 may use the input method rank 224 to automatically determine the input method to use. The initial primary method rank 224 may vary based on the application used. For example, the primary input method for a word processor may be different than the primary input method for an internet browser. After the initial input method rank 224 is formed, then the operation may proceed to operation 411 from FIG. 4, consistent with various embodiments.

If the user does not want to use the results from a prior session in operation 513, then the initial primary input method may be selected by the user or selected by the daemon 120 arbitrarily based on the language selected. For example, if the language is Chinese, then the daemon 120 may arbitrarily assign the WUBI input method from a list of input methods in the input method portfolio 210. In certain embodiments, the daemon 120 may access the network 306 to determine a frequently used input method for a particular language or locale. For example, the daemon 120 may note that the locale is mainland China and access the network to determine that PINYIN is the most popular input method used by other users and select PINYIN as the input method.

Figure 6:
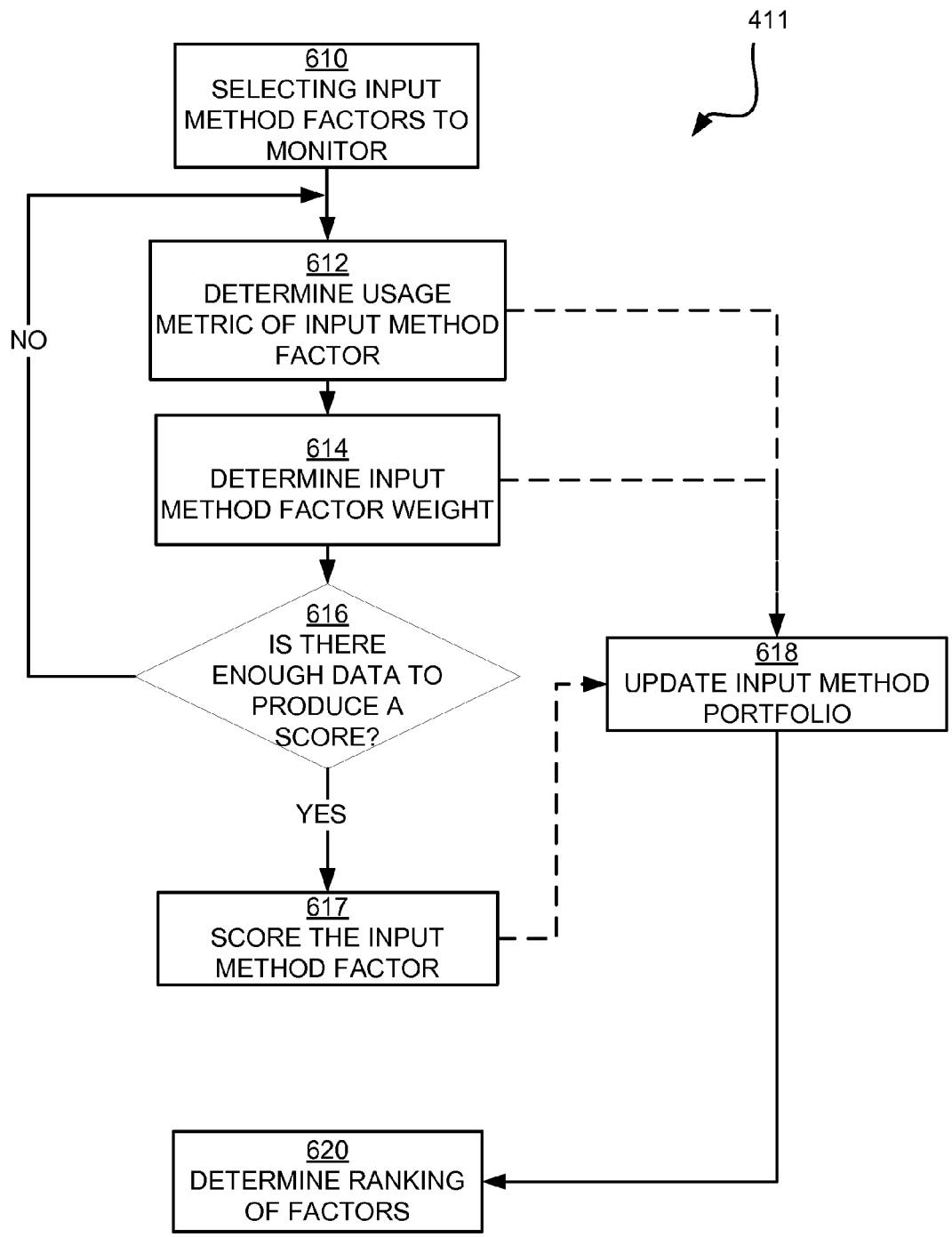
FIG. 6 depicts a flowchart of a method of monitoring and scoring a pattern of input method usage, consistent with various embodiments.

FIG. 6 depicts a flowchart of a method 411 of monitoring and scoring a pattern of input method usage, consistent with various embodiments. The method 411 may correspond to operation 411 in FIG. 4. The method 411 may monitor the client computer 102 for input method factors 220. For example, the input method factors 220 may determine a user's affinity for an input method for a certain language used. The method 411 may begin at operation 610, where the daemon 120 selects input method factors 220 to monitor based on prior usage of the input method. Input method factors 220 to be selected may also be customized by the user. The input method factors 220 used in method 411 may include a language, location, locale, an application, user interaction with a particular input method, or any other parameter associated with a particular input method. Throughout this disclosure, language and locale may be used as examples but more input method factors 220 may be used. The input method factors 220 may be tracked according to the input method used for each application or by examining how input methods are used by the client computer 102 as a whole.

For example, when looking at the client computer 102 as a whole, the daemon 120 may examine a frequency of input methods used for each application and give a total for the client computer 102. In the above example, if the PINYIN input method was used three times and the WUBI input method was used two times for the web browser, and the WUBI input method was used ten times and the PINYIN input method was used four times for the word processor, then the WUBI input method may have a higher rank than the PINYIN input method for the client computer 102.

After the input method factors 220 are monitored, the method 411 may continue to operation 612. In operation 612, the usage metric of the input method factor 220 may be determined. Although usage metric is referred to throughout this disclosure. The usage metric can one type of metric. For example, other metrics may include performance metrics, or impact metrics in various embodiments. In certain embodiments, the usage metric may be a count of the input method factor 220. For example, the daemon 120 may determine the usage metric is the number of characters used for an input method with the input method factor 220 being the characters used for the input method. In another example, the usage metric is the counts of loading locale objects in each language with the input method factor 220 being the locale. In another example, the number of times a language is used may be the usage metric with the language as the input method factor 220. In certain embodiments, operation 612 may be combined with operation 610.

The usage metric may be flexible. The usage metric may be the number of times that an input method is invoked. The usage metric may be a statistical value. For example, if the input method WUBI is used sixty out ninety instances, while the input method PINYIN is used forty out of fifty instances, then the usage metric may favor the input method PINYIN. In certain embodiments, the pseudo code that represents obtaining the usage metrics may be represented as follows:

```
In locale selection level
switch(Locale_obj->state) { //Locale Object State
    case LOCSEL_STATE:  //change locale request
        change_locale_operation( ); // normal locale selection operation
        Change_Locale_Record(locale_name, application_ID);
// recorded the locale changes
    break;
In input method select level
switch(IME_obj->state) { //IME Object State
    case IMESEL_STATE:  //change IME request
        change_ime_operation( ); // normal IME selection operation
        Change_IME_Record(IME_name, application_ID);
// recorded the IME changes
    break;
```

After the usage metric is determined, then the method 411 may continue to operation 614. In operation 614, the weight for the factor may be determined. In various embodiments, the user may set the weight of the factor. For example, the user may determine that the language factor has a 70% weight, the locale factor has a 5% weight, and the input method factor has a 25% weight.

After the weight for each factor is determined, then the method 411 may proceed to operation 616. In operation 616, the daemon 120 may determine whether there is enough data from the input method factor usage metric and weight to produce a score (discussed below). In certain embodiments, the score may be the weight adjusted usage metric. In the mentioned embodiment, an absence of either the weight or usage metric for the input method factor 220 may produce an absence of a score. For example, if the input metric factor is locale usage, the usage metric is undefined, and the weight is 40%, then the score may be undefined. If there is no score, then the method 411 may continue to operation 612 where the input method factor usage metric may be determined. If there is enough data to produce a score, then the method continues to operation 617. In operation 617, the score for the input method factor 220 may be determined by the daemon 120.

After the factor data is associated with the factor, the method 411 may proceed to operation 618. Operation 618 may include updating the input method portfolio 210 with the updated usage metric, weight, and score. In operation 618, the weight, and usage metric data for each input method factor 220 may be associated with the input method factor 220 in the input method portfolio 210. The input method factor 220 may be utilized by the daemon 120. For example, if the daemon 120 determines that the PINYIN input method was used four times when browsing the web, then the input method portfolio 210 may contain an entry for pin yin, followed by the fact that PINYIN was used four times by the user using the web browser.

In operation 620, the daemon 120 may rank the input methods from the input method portfolio 210 by applying the weight for each one of the input method factors 220 to the usage metric. In operation 620, the daemon 120 may change the rank of the input methods in response to updates in the input method portfolio 210. For example, if the user visits a .jp as Japanese domain for three hours, but the primary input method is WUBI as an input method for the Chinese language, then the daemon 120 may rerank the input methods or factors. In the mentioned example, the daemon 120 may give a higher weight to more recently accessed domains on the web browser and may increase the Japanese rank. Operation 620 may be further described in FIG. 7.

FIG. 7 depicts a table 700 that may result from the scoring of the input methods, consistent with various embodiments. The table 700 may include the usage metrics and the weights to the factors. The factors shown are language 710, locale 712, and input method 714. The factors are scored based on the usage metrics and the weights to the factors. This score may be stored in the input method portfolio 210.

The rank 716 is obtained using the scores obtained from the different factors. In the shown embodiment, the weight of the language, locale, and the input methods total to 100 percent but the factors may contain any number of weights. In various embodiments, the user may modify the weight associated with a particular factor. For example, the user may assign a higher weight to a mainland China locale than to a Singaporean Chinese locale.

In certain embodiments, the weight may be modified based on user interactions with the client computer 102. For example, if an IP address originates from Singapore, then the daemon 120 may assign a higher weight to the Singaporean Chinese locale. In another example, the user may use the WUBI input method to write personal documents but may use PINYIN to write work documents. In this example, the daemon 120 may give a higher weight to the WUBI input method from the time between the hours of 0900-1500.

In the shown embodiment, the number of times accessed is the preference while the actual number value is a usage metric. The table 700 may represent the usage of one or more applications. For example, the table 700 may represent a web browser, or may represent a total of the client computer 102.

In various embodiments, the score is the product of the usage metric and the weight. The score may be used to determine the rank 716. The rank 716 may be determined by combining the scores of the factors. In the shown example, the four input methods are either Chinese, PINYIN and WUBI, or Japanese, ROMANJI and KANA. In the shown example, PINYIN and WUBI may use either the Mainland China locale or Singapore locale for mandarin Chinese. All of the factors are combined to produce the score on 716. In certain embodiments, the daemon 120 may determine that Chinese is the most accessed language by score with the Mainland China locale the most accessed locale.

In this example, due to Mandarin Chinese having a higher language 710 score than Japanese, the PINYIN input method may be ranked higher than the ROMANJI input method, even though the ROMANJI input method is accessed more times than the WUBI input method. In certain embodiments, the weight of language 710 may be reduced or eliminated, and the ROMANJI input method may be ranked higher than the PINYIN input method.

Figure 8:
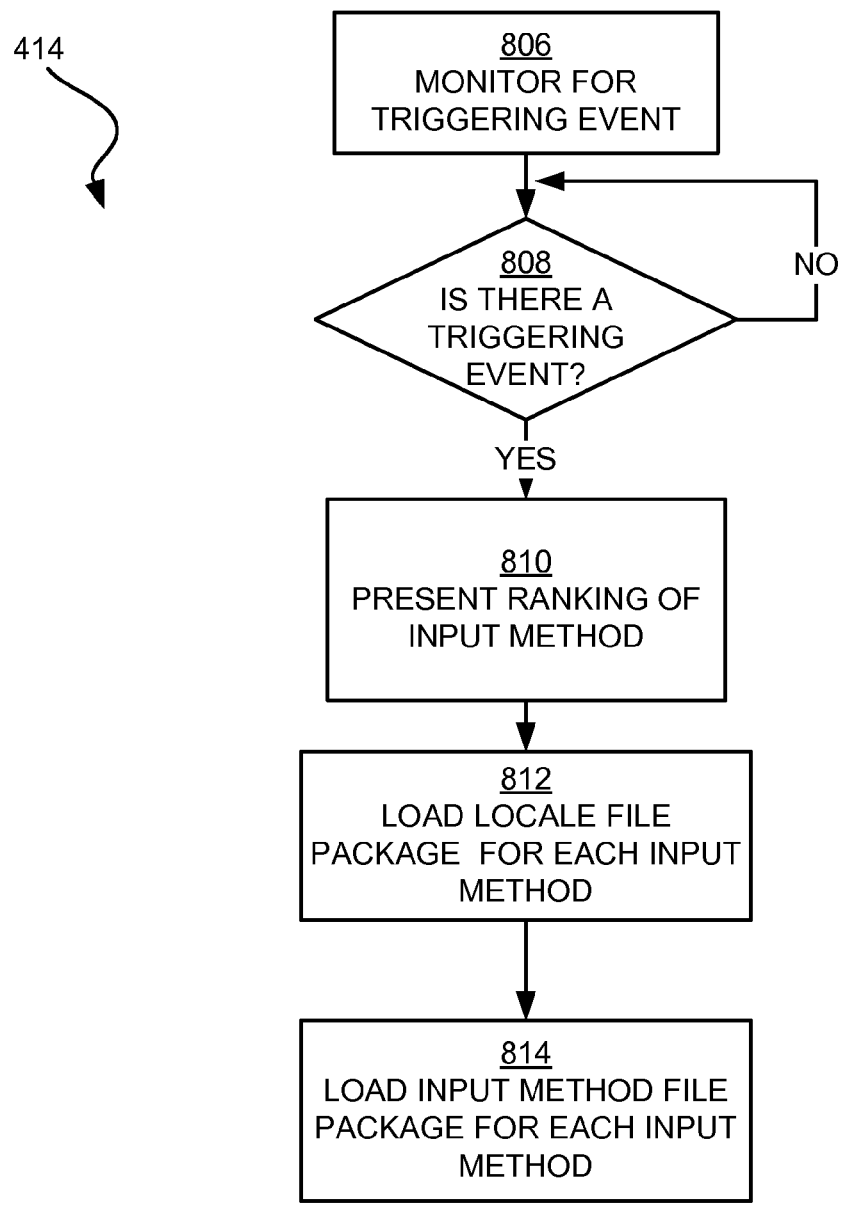
FIG. 8 depicts a method of presenting an input method rank, consistent with various embodiments.

FIG. 8 depicts a method 414 of presenting an input method rank, consistent with various embodiments. Method 414 may correspond to operation 414 in FIG. 4. In method 414, the client computer 102 user may present an input method rank 224 to the user. The input method rank 224 may include the primary input method based on the ranking of the input method in the input method portfolio 210. The method 414 may begin at operation 806. In operation 806, one or more triggering events are monitored. The triggering event may trigger the input method rank 224 to be displayed, e.g., on the user selection interface 232.

The user may further interact with the user selection interface 232 using the human interface device 116. The triggering event may use the user's interaction with specific applications, e.g., a text editor, a web page, or a word processor, on the client computer 102. Examples of a triggering event for a web browser may include; accessing the web browser, visiting a particular domain of a web page that indicates a country, or action by the human interface device 116 such as typing, or voice commands. Examples of a triggering event for a word processor may include; using a particular language of a document, or using the application from a geographic location of the user. After the daemon 120 monitors the client computer 102 for a triggering event in operation 806, the method 414 may proceed to operation 808. In operation 808, the daemon 120 may determine if there is a triggering event. If there is an absence of a triggering event, then the method 414 may continue to operation 806. If there is a presence of a triggering event, then the method 414 may continue to operation 810.

In operation 810, the daemon 120 may ensure that the input method rank 224 is presented. Operation 810 may include identifying the primary input method using the input method rank 224. For example, the input method rank 224 may include a plurality of input methods and the input method that is ranked first, i.e., the highest score, may be considered the primary input method. In various embodiments, only the primary input method may be presented. In certain embodiments, the input method rank 224 may be displayed without regard to order or according to a cutoff. For example, if the input method rank 224 is configured to display only the top five input methods, then the order of the input methods may be the second, the third, the fifth, the first, and the fourth input method.

The input method rank 224 may be obtained from operation 411 from FIG. 4. For example, if the input method hanja is ranked first in the input method portfolio 210 from operation 411 from FIG. 4, then the Korean locale and Korean language may be selected. In another example, if the input method WUBI is ranked first in the input method portfolio 210, either a mainland China locale, a Hong Kong locale, or a Singaporean Chinese locale may be selected depending on the score of the input method factor locale derived in operation 620.

After the primary input method is selected, the method 414 may continue to operation 812. In operation 812, the locale file package 214 that corresponds to a particular input method may be loaded. In various embodiments, the locale file package 214 may be located in the locale file package 214 on the client computer 102. In certain embodiments, the locale file package 214 may be downloaded from the network 306 or a server 304. The locale file package 214 may be the locale associated with the primary input method. For example, the WUBI input method may correspond to either the mainland China locale or the Taiwan locale, but not the Japan locale. In certain embodiments, the locale may not correlate with the primary input method, e.g., the WUBI input method may use the Japan locale as the locale file package 214.

Operation 812 may occur simultaneously with operation 814. In operation 814, the daemon 120 may load the input method file package 216 for each input method on the input method rank 224. In various embodiments, the input method rank 224 may be limited, for example, to the top twenty input methods by score. In certain embodiments, the input method rank 224 may encompass the entire input method portfolio 210.

Figure 9:
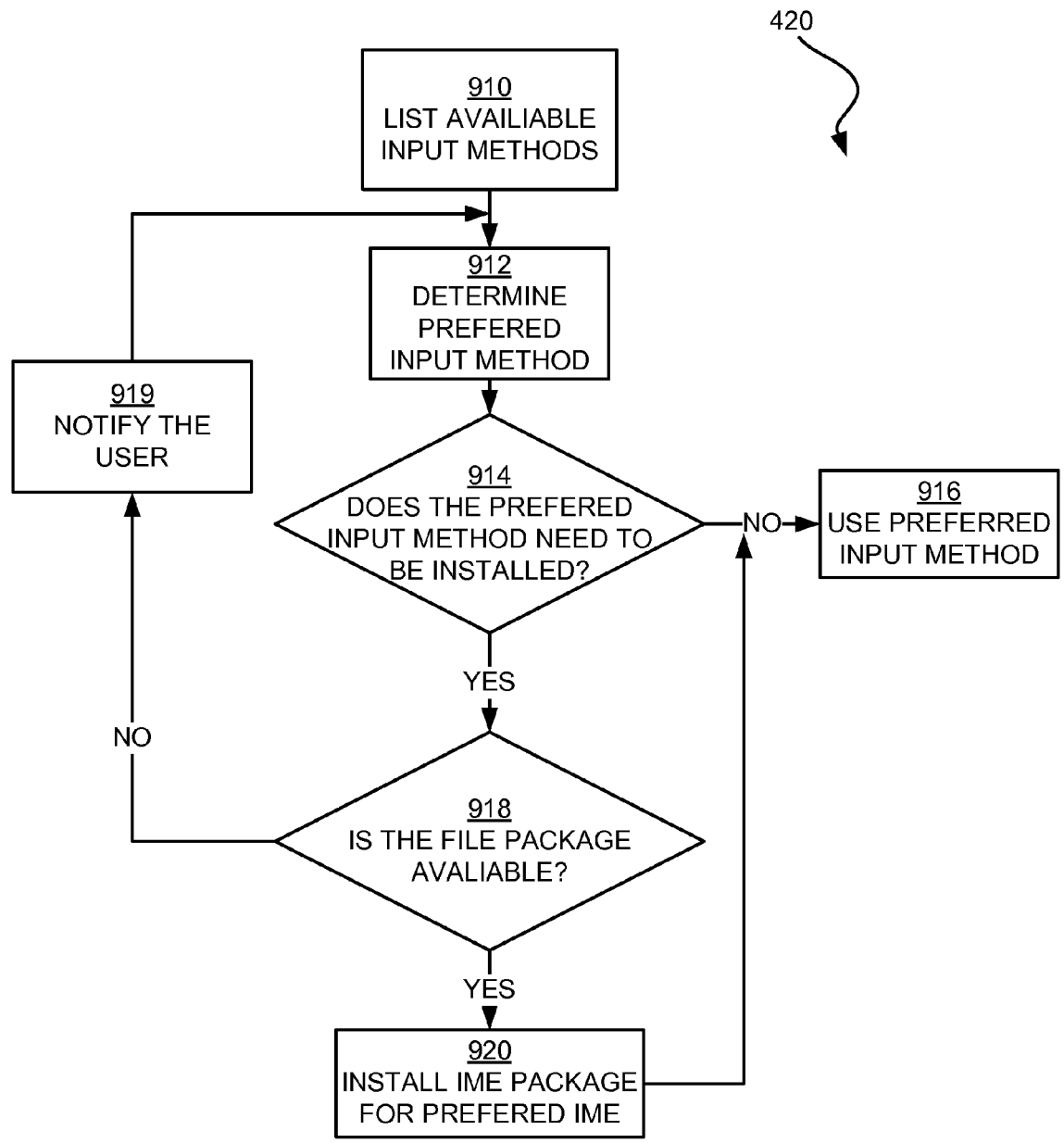
FIG. 9 depicts a method of selecting a preferred input method, consistent with various embodiments.

FIG. 9 depicts a method 420 of selecting a preferred input method, consistent with various embodiments. As discussed above, the preferred input method may be an input method that the user selects other than the primary input method.

If the user rejects the primary input method and selects another input method, then the method 420 may continue to operation 910. In operation 910, the daemon 120 may provide the user with a list of all the input methods available. The list may include the input methods installed on the client computer 102 or available on the server 304 through the network 306. The available input method may also be available through a third-party vendor. Operation 910 may involve referring to an input method server list 222 to obtain the list of input methods. The list of input methods may be categorized or in a random order. In certain embodiments, the list of input methods may be ranked in a similar manner to operation 411 in FIG. 4.

After all input methods available to the user are presented, the method 420 may proceed to operation 912. In operation 912, a preferred input method may be selected by the user. In an embodiment, the user may be shown a list of all available input methods. The user may select the preferred input method based on the user's preferences. For example, the user may be presented with the WUBI as the primary input method but may prefer the PINYIN input method and may select the PINYIN input method.

After the user selects the preferred input method, then the method 420 may continue to operation 914. In operation 914, the preferred input method installation manager 228 may determine whether the input method file package 216 needs to be installed for the preferred input method. The preferred input method installation manager 228 may search the input method file packages 216 on the client computer 102, consistent with various embodiments. The preferred input method installation manager 228 may also search any network 306 locations for the input method file packages 216. If the preferred input method is already on the client computer 102, then the method 420 may continue to operation 916. In operation 916, the user uses the preferred input method and the method 420 may continue to operation 412.

If the preferred input method installation manager 228 requires that the preferred input method be installed, then the method 420 may continue to operation 918. In operation 918, the preferred input method installation manager 228 may also determine whether the input method file package 216 or the locale file package 214 is available. In certain embodiments, the preferred input method installation manager 228 may determine whether the server 304 containing the preferred input method file packages, e.g., 304A, 304B, or 304C, is active. If the file packages are not active, then the method 420 may continue to operation 919 where the user is notified that the file package is not available. After operation 919, the method 420 may proceed to operation 912 where the user may select a new preferred input method.

If the file package is available, then the method 420 may continue to operation 920 where the preferred input method installation manager 228 installs the preferred input method. In certain embodiments, the preferred input method installation manager 228 may prompt the user to confirm input method installation.

The user may also authorize the preferred input method installation manager 228 to automatically install the preferred input method if it is not available on the client computer 102. If the server 304 is active, then the preferred input method installation files may be obtained and the preferred input method may be installed. After the preferred input method is installed, then the method 420 may continue to operation 916 and the weight of the preferred input method may be adjusted.

Embodiments of the disclosure can take the form of an entirely hardware embodiment, an entirely software embodiment, or an embodiment containing both hardware and software elements. In certain embodiments, the disclosure is implemented in software, which includes but is not limited to firmware, resident software, microcode, etc.

Furthermore, embodiments of the disclosure can take the form of a computer program product accessible from a computer-usable or computer-readable storage medium providing program code for use by or in connection with a computer or any instruction execution system. For the purposes of this description, a computer usable or computer readable storage medium can be any apparatus that can store the program for use by or in connection with the instruction execution system, apparatus, or device.

The computer-useable or computer-readable storage medium can be an electronic, magnetic, optical, electromagnetic, or semiconductor system (or apparatus or device), or a propagation medium. Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/Write (CD-R/W), and a digital video disk (DVD).

An embodiment of a data processing system suitable for storing and/or executing program code includes at least one processor coupled directly or indirectly to memory elements through a system bus such as a data, address, and/or control bus. The memory elements can include local memory employed during actual execution of the program code, bulk storage, and cache memories which may provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

Although the operations of the method(s) herein are shown and described in a particular order, the order of the operations of each method may be altered so that certain operations may be performed in an inverse order or so that certain operations may be performed, at least in part, concurrently with other operations. In certain embodiments, instructions or sub-operations of distinct operations may be implemented in an intermittent and/or alternating manner.

Although specific embodiments of the disclosure have been described and illustrated, the disclosure is not to be limited to the specific forms or arrangements of parts so described and illustrated. The scope of the disclosure is to be defined by the claims appended hereto and their equivalents.

What is claimed is:

1. A system of selecting a primary input method from a plurality of input methods, each input method defines how input from a human interface device is interpreted by a receiving application on a computing processing system, comprising:
   an input method portfolio having the plurality of input methods, each input method having one or more input method factors, an input method factor determines affinity of a user profile from a prior session for the input method for a certain language used;

an input method daemon configured to:
- determine a numerical score for one or more input method factors in the input method portfolio using a metric of the input method factor and a weight of the input method factor;
- rank the input methods in the input method portfolio as a function of the numerical score of the input method factor;
- present a user selection interface that lists the plurality of input methods in the input method portfolio as a function of the rank, wherein the input method portfolio has a cutoff;
- determine whether there is a stale input method in the input method portfolio, the stale input method is an input method that is unlikely to be presented, wherein the stale input method is not accessed for a particular time;
- highlight, visually, the stale input method in the user selection interface; and
- remove the stale input method from the input method portfolio.

2. The system of claim 1, wherein the input method daemon is configured to present a preferred input method in response to a triggering event that includes an interaction with a document in a particular language through a word processor.

3. The system of claim 1, wherein the input method factor is selected from: language, location, locale, application, history of input method usage, and history of locale usage, and user interaction.

4. The system of claim 3, wherein the location is determined by GPS, geo-location data, and processed scripts.

5. The system of claim 1, wherein the input method daemon is configured to determine the numerical score by:
- determining a first input method factor that is a historical usage of a language by the user profile,
- determining a second input method factor that is a geographic location for the user profile, and
- increasing the weight of the second input method factor responsive to the historical usage of the language by the user profile.

6. The system of claim 5, wherein the input method daemon is configured to:
- determine a locale of the input method based on the second input method factor;
- present a user selection interface that lists the locale for each input method from the plurality of input methods.

7. The system of claim 5, wherein the input method daemon is configured to determine the numerical score of the input method factor by:
- determining a third input method factor that is a time of usage by the user profile;
- determining a fourth input method factor that is a work document; and
- increasing the weight of the fourth input method factor responsive to the time of usage by the user profile.

8. The system of claim 1, wherein the input method factor includes a locale, wherein the input method daemon is configured to:
- analyze a web page; and
- determine the locale from the web page, wherein the locale is a set of cultural and linguistic preferences.

9. The system of claim 1, wherein the stale input method is an input method from the input method portfolio below a particular rank.

* * * * *